(12) United States Patent
Yeh et al.

(10) Patent No.: US 8,328,146 B2
(45) Date of Patent: Dec. 11, 2012

(54) CABLE TIE ASSEMBLY

(75) Inventors: Chin-Wen Yeh, Taipei Hsien (TW); Zhen-Neng Lin, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 387 days.

(21) Appl. No.: 12/701,552

(22) Filed: Feb. 6, 2010

(65) Prior Publication Data

US 2011/0094066 A1 Apr. 28, 2011

(30) Foreign Application Priority Data

Oct. 28, 2009 (CN) .................... 2009 2 0313471 U

(51) Int. Cl.
*F16L 3/08* (2006.01)
*B65D 63/18* (2006.01)

(52) U.S. Cl. ................ 248/74.3; 248/71; 24/16 PB
(58) Field of Classification Search ................ None
See application file for complete search history.

(56) References Cited

U.S. PATENT DOCUMENTS

| 5,598,994 | A  | * | 2/1997 | Olewinski et al. | 248/73 |
| 7,762,503 | B2 | * | 7/2010 | Franks | 248/71 |
| 7,832,693 | B2 | * | 11/2010 | Moerke et al. | 248/71 |

* cited by examiner

*Primary Examiner* — Jack W. Lavinder
(74) *Attorney, Agent, or Firm* — Altis Law Group, Inc.

(57) ABSTRACT

A cable tie assembly includes a securing panel defining a securing slot and a strap. The cable tie includes a head, an elongated strap portion extending from the head, and a mounting portion. The elongated strap portion includes a strap body and a distal end extending from the strap body. The distal end includes a plurality of teeth. The head has a securing hole and a tab disposed in the securing hole. The tab is configured to mesh with the teeth as the distal end is pulled through the securing hole.

6 Claims, 4 Drawing Sheets

CABLE TIE ASSEMBLY

BACKGROUND

1. Technical Field

The disclosure relates to cable tie assemblies.

2. Description of Related Art

There are many cables or wires used in a computer, such as for power output and data transmission. These cables are secured by a plurality of securing portions directly extending from the enclosure of the computer. Plastic surfaces of these cables may be damaged if the securing portions are applied too tightly.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
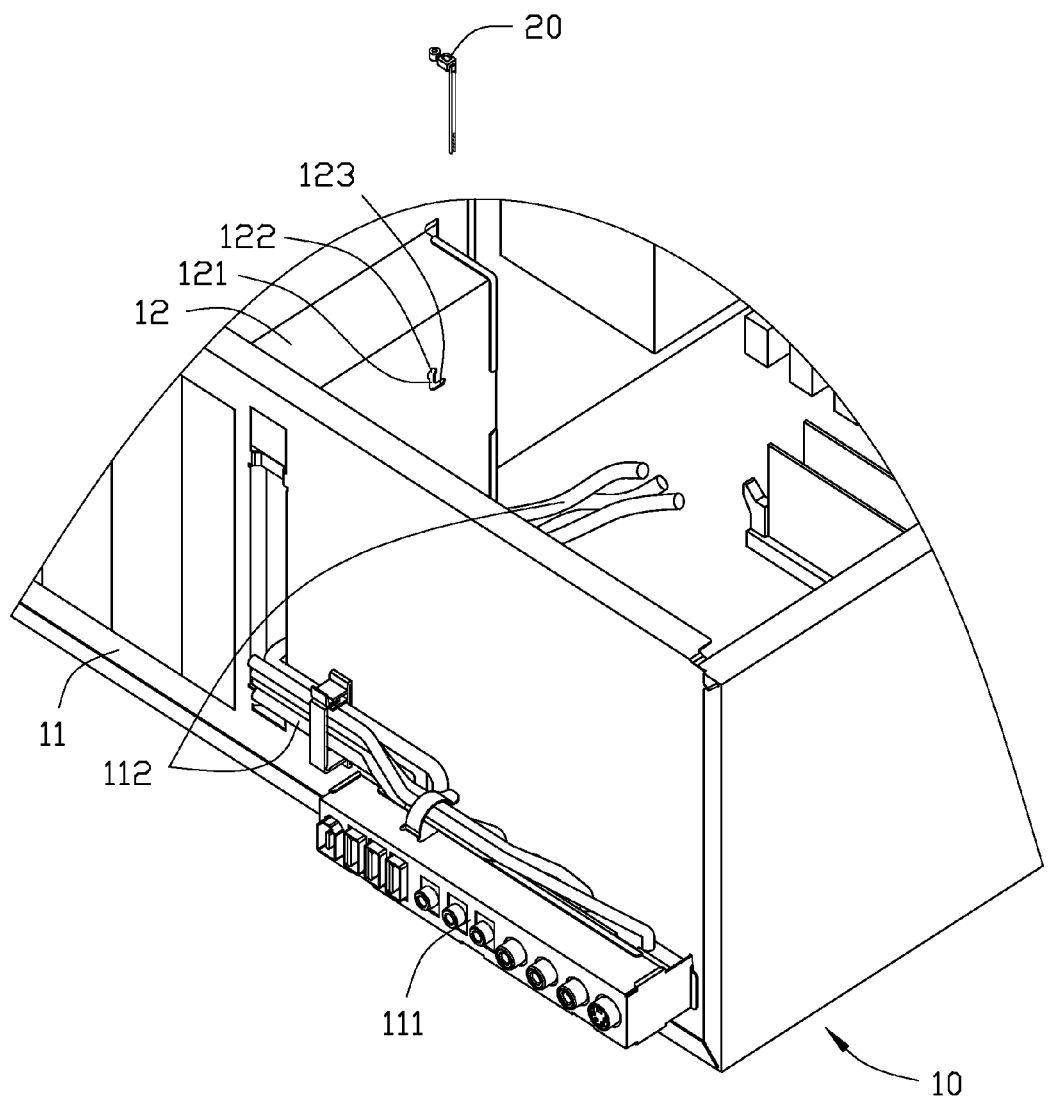
FIG. 1 is an exploded, isometric view of a cable tie assembly of an embodiment.

Referring to FIG. 1, an enclosure 10 includes a rear panel 11 and a securing panel 12 disposed in the enclosure 10. A cable tie 20 is configured to be applied in the enclosure 10.

The enclosure 10 includes a rear panel 11 and a securing panel 12 disposed in the enclosure 10. A plurality of connectors 111 is mounted to the rear panel 11. A set of connecting lines 112 which connects to the plurality of connectors 11 extends into the enclosure 10.

The securing panel 12 defines a securing slot. The securing slot 12 defines a broader slot 122 and a narrower slot 123. In one embodiment, the securing slot 12 is generally L-shaped.

Figure 2:
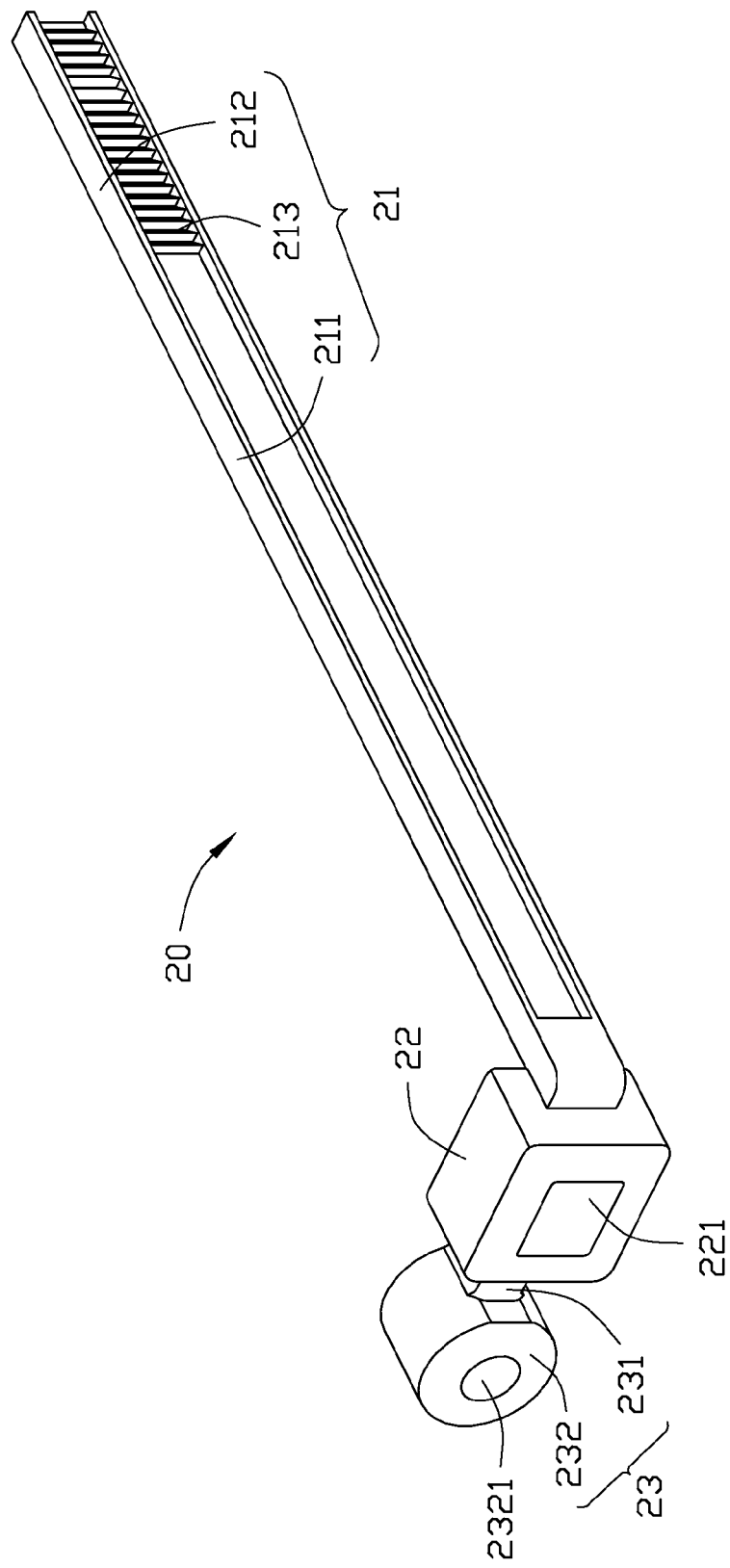
FIG. 2 is an isometric view of a cable tie of FIG. 1.
Figure 3:
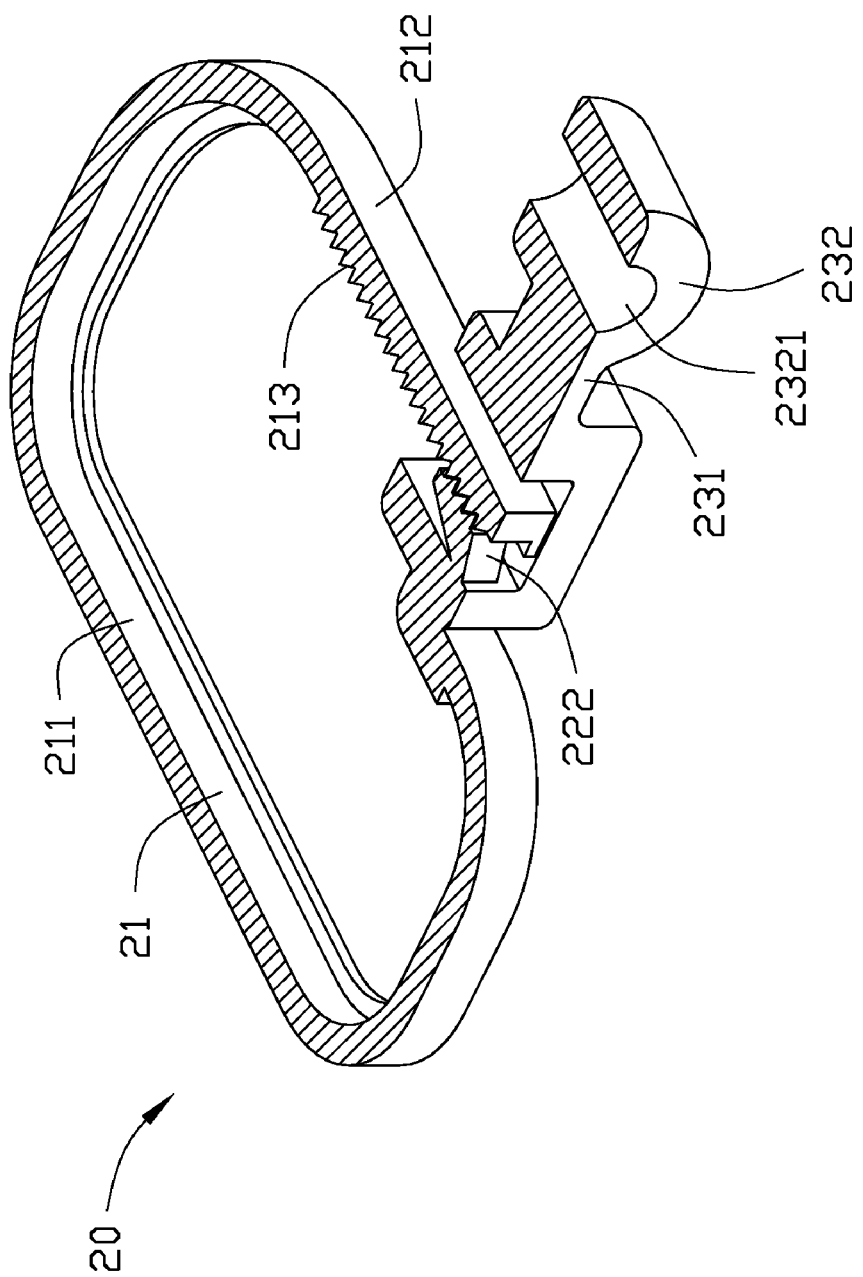
FIG. 3 is a section view of the cable tie of FIG. 2.
Figure 4:
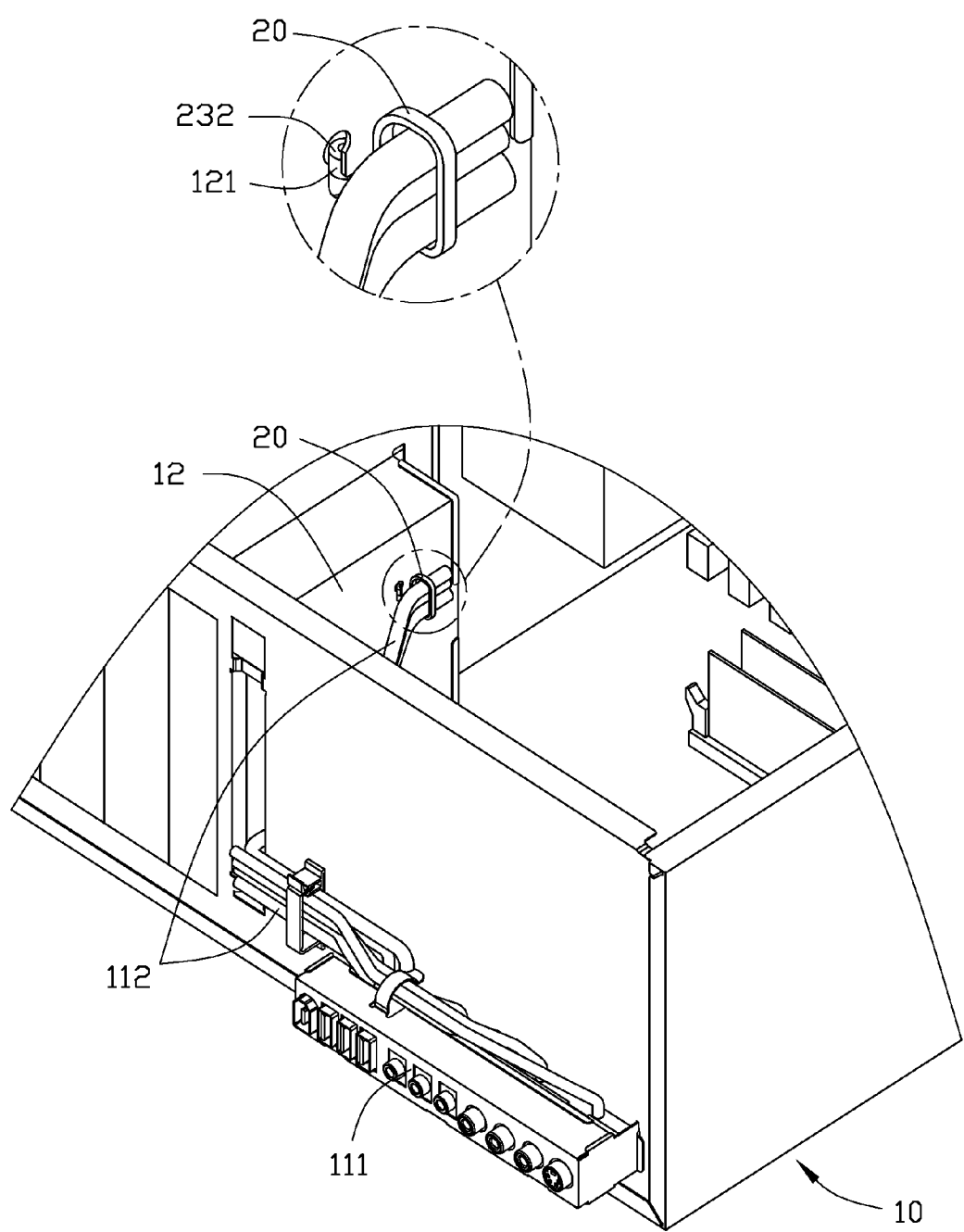
FIG. 4 is an assembly view of FIG. 1.

Referring to FIGS. 2 and 3, the cable tie 20 includes an elongated strap portion 21, a head 22 extending from the elongated strap portion 21, and a mounting portion 23 extending from the head 22.

The elongated strap portion 21 includes a strap body 211 connecting to the head 22 and a distal end 212 extending from the strap body 211. The distal end 212 includes a plurality of teeth 213. The head 22 defines a securing hole 221. The head 22 includes a tab 222 disposed in the securing hole 221. The tab 222 is configured to mesh with the teeth 213.

The mounting portion 23 includes a connecting portion 231 connecting to the head 22 and a cylindrical securing portion 232. The securing portion 232 defines a through hole 2321. The extending direction of the through hole 2321 is parallel to the extending direction of the elongated strap portion 21. The cross section of the connecting portion 231 is less than the narrower slot 123 of the securing slot 121. The cross section of the securing portion 232 is larger than the narrower slot 123 and less than the broader slot 122 of the securing slot 121. The cross section of the head 22 is larger than the narrower slot 123.

Referring to FIGS. 1 to 4, in assembly, the elongated strap portion 21 of the cable tie 20 surrounds the connecting lines 112. The distal end 212 is inserted into the securing hole 221 with the teeth 213 engaging with the tab 222 of the cable tie 20. Thus, the cable tie 20 secures the connecting lines 112. The securing portion 232 of the cable tie 20 passes through the broader slot 122 of the securing slot 121 and slides into the narrower slot 123 of the securing slot 121. The set of the connecting lines 112 on the securing panel 12 is mounted to the enclosure 10. In this way, the securing portion 232 and the head 22 are disposed on two opposite sides of the securing panel 12.

In disassembly, the securing portion 232 of the cable tie 20 is removed from the narrower slot 123 of the securing slot 121 to the broader slot 122 of the securing slot 121. The securing portion 232 passes through the broader slot 122, thereby removing the set of the connecting lines 112 from the securing panel 12.

In another embodiment, the securing slot 121 is generally C-shaped.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A cable tie assembly, comprising:
a securing panel defining a securing slot; and
a cable tie comprising a head, an elongated strap portion extending from the head, and a mounting portion; the mounting portion comprises a connecting portion extending from the head and a securing portion extending from the connecting portion; the securing portion defines a through hole; an extending direction of the through hole is parallel to an extending direction of the elongated strap portion; the mounting portion is configured to be received in the securing slot to enable the securing portion and the head to be located on opposite sides of the securing panel; the elongated strap portion comprises a strap body and a distal end extending from the strap body; the distal end comprises a plurality of teeth; and the head has a securing hole and a tab disposed in the securing hole, and the tab is configured to mesh with one of the plurality of teeth as the distal end is pulled through the securing hole.

2. The cable tie assembly of claim 1, wherein the securing slot defines a broader slot and a narrower slot connected to the broader slot, a cross section of the connecting portion is less than the narrower slot, and a cross section of the securing portion is less than the broader slot and larger than the narrower slot.

3. The cable tie assembly of claim 2, wherein the mounting portion extends from the head, the mounting portion and the elongated strap portion are disposed on two opposite sides of the head.

4. The cable tie assembly of claim 2, wherein a cross section of the head is larger than the narrower slot.

5. The cable tie assembly of claim 2, wherein the securing portion is column-shaped.

6. The cable tie assembly of claim 1, wherein the securing slot is L-shaped or C-shaped.

* * * * *